United States Patent Office 3,743,532
Patented July 3, 1973

3,743,532
COATED SUBSTRATE FORMED FROM
PHOTOPOLYMERIZED GAS
Archibald N. Wright, Schenectady, and Richard C. Merrill, Glen Falls, N.Y., assignors to General Electric Company
Original application Dec. 29, 1969, Ser. No. 888,524, now Patent No. 3,665,269. Divided and this application Jan. 31, 1972, Ser. No. 222,365
Int. Cl. C23c 13/00
U.S. Cl. 117—93.31          1 Claim

ABSTRACT OF THE DISCLOSURE

Capacitors are provided having a first metal substrate, a dielectric film on such substrate and a second electrode on the dielectric film which is made by the photopolymerization of certain photopolymerizable organic materials in vaporous form.

This is a division of application Ser. No. 888,524, filed Dec. 29, 1969, now Pat. No. 3,665,269, which is a continuation of application Ser. No. 530,813, filed Mar. 1, 1966 now abandoned.

This invention relates to capacitors and more particularly to capacitors which are provided with a continuous film formed by ultraviolet surface photopolymerization of a gaseous material.

A conventional type of capacitor has a pair of parallel electrically conducting plates or electrodes separated by electrically insulating or dielectric film and an electrical lead connected to each of the electrodes. Such dielectric films should have a low dissipation factor, thinness, a high dielectric constant, and a high breakdown strength. Additionally, when a dielectric film is employed, it must be continuous and be in a pinhole-free state to function as an effective dielectric. It is further required that the film material be stable at the temperature of operation of the particular capacitor. However, when a supported dielectric film is employed, the film must be adhesive. Configurational deposition is also sometimes desirable.

My invention is directed to an improved capacitor with a thin dielectric film which exhibits the above desirable characteristics. This dielectric film is formed by ultraviolet surface photopolymerization of a gaseous material selected from the group consisting of ethylene, 2,4-hexadiene, 1,5-hexadiene, methyl methacrylate, hexachlorobutadiene, tetrafluoroethylene, trifluoromonochloroethylene, monofluorotrichloroethylene, hexafluorobutadiene, and acrylonitrile in accordance with the method described and claimed in application Ser. No. 530,813, which application is assigned to the same assignee as the present application.

Hexachlorobutadiene is not subject to conventional forms of polymerization. While tetrafluoroethylene, hexafluorobutadiene, and acrylonitrile have been polymerized by conventional means, these materials have not been polymerized by ultraviolet surface photopolymerization from a gaseous phase. Methyl methacrylate has been polymerized by ultraviolet surface photopolymerization, but this material has not been formed into a continuous, substantially pinhole-free film. None of the above group of materials has been found to be a unique, adhesive, thin dielectric film for a capacitor.

It is an object of my invention to provide an improved capacitor which has an adherent, continuous, thin, essentially pinhole-free dielectric film.

It is another object of my invention to provide an improved capacitor in which the dielectric film is formed by ultraviolet surface photopolymerization from a gaseous material.

It is a further object of my invention to provide an improved capacitor which has a dielectric polymer film formed by ultraviolet surface photopolymerization of gaseous hexachlorobutadiene.

In accordance with my invention, a capacitor can be formed which has a first electrode, a continuous, pinhole-free dielectric film adhering firmly to a surface of the first electrode, the film formed by ultraviolet surface photopolymerization of a gaseous material selected from a specific group of materials, a second electrode in contact with dielectric film, and an electrical lead connected to each of the electrodes.

These and various other objects, features, and advantages of the invention will be better understood from the following description taken in connection with the accompanying drawing in which.

Figure 1:
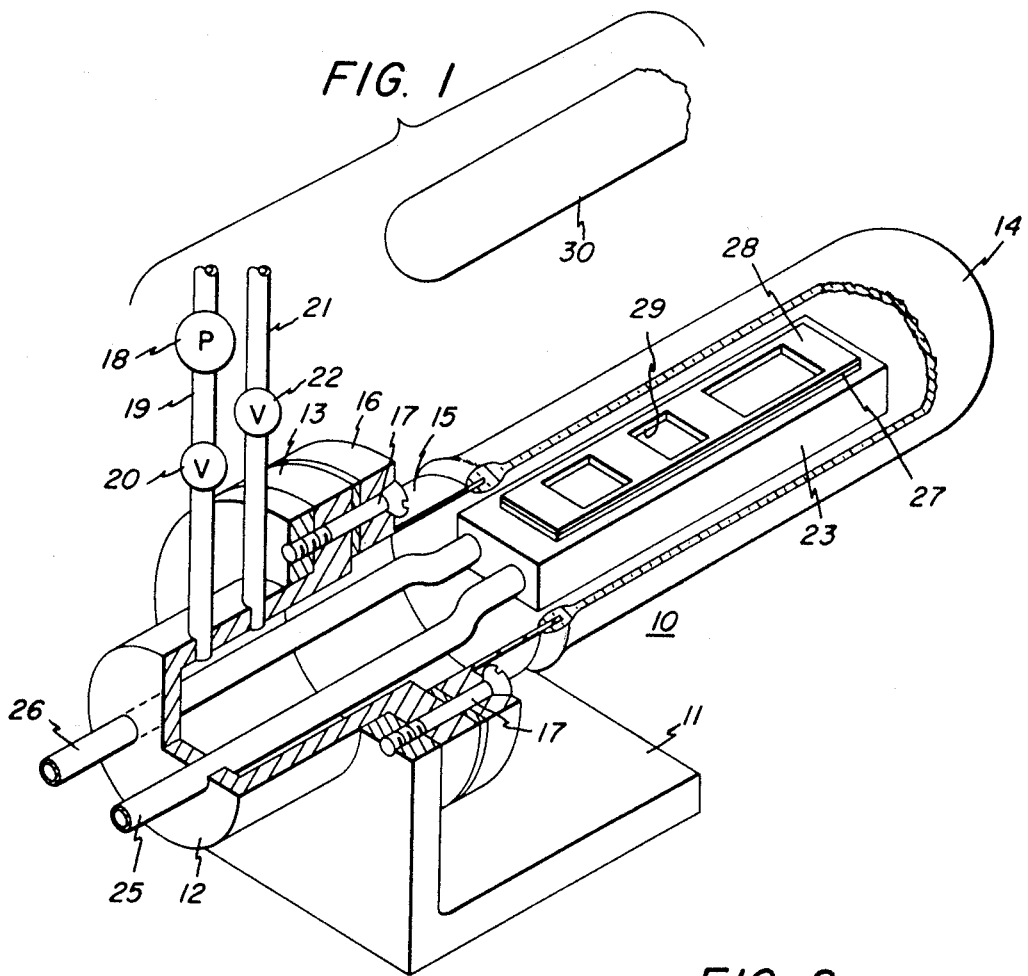
FIG. 1 is a perspective view partially in section of an apparatus for forming dielectric films on electrodes in accordance with our invention.

In FIG. 1 of the drawing, apparatus is shown generally at 10 for forming dielectric films on the surfaces of electrodes for producing capacitors in accordance with our invention. A base or support surface (not shown) is provided on which is mounted an L-shaped bracket 11 to support enclosure or chamber 12 having a flange 13 at its open end. A quartz tube 14 is bonded adjacent at its open end by any suitable metal-ceramic seal to a metal cylinder 15 having a flange 16 at its opposite end. Flange 16 is readily threaded to and unthreaded from flange 13 of enclosure 12 by means of a plurality of threaded fasteners 17.

A vacuum pump 18 is connected by a line 19 to enclosure 12 to evacuate the latter and associated quartz tube 14. A control valve 20 is provided in evacuation line 19. An inlet line 21 is connected at one end to enclosure 12 and at its other end to a source (not shown) of material to be supplied in gaseous state to tube 14. A control valve 22 is provided in line 21 to control the supply of material to enclosure 12 and tube 14.

A support block 23 of material such as copper, as shown, is positioned within tube 14. Block 23 has an U-shaped metal tube 24 imbedded therein, two ends 25 and 26 of which extend through cylinder 15, flanges 16 and 13, enclosure 12 and through the wall of the latter. Tube 24 circulates a cooling medium such as ethanol to block 23 and positions the block. The ends 25 and 26 of tube 24 are connected to a heat exchanger or to other cooling equipment. A substrate in the form of an aluminum foil electrode 27 is shown positioned on support block 23. A stainless steel light mask 28, which is shown as the same size as aluminum foil 27, has three slots 29 therethrough to provide formation of predetermined patterned thin dielectric films on aluminum foil 27. An ultraviolet light 30, which is normally provided with a reflector (not shown), is shown outside and spaced about quartz tube 14 and supported in any suitable manner. Such a light source provided ultraviolet light in a region of about 2,000 angstroms to 3,500 angstroms, which is directed by the reflector (not shown) towards the upper surface of aluminum foil electrode 27. For example, an Hanovia 700-watt lamp with a reflector will provide this particular light region. A metal enclosure with a door, which is not shown, is positioned around the above apparatus during its operation.

Figure 2:
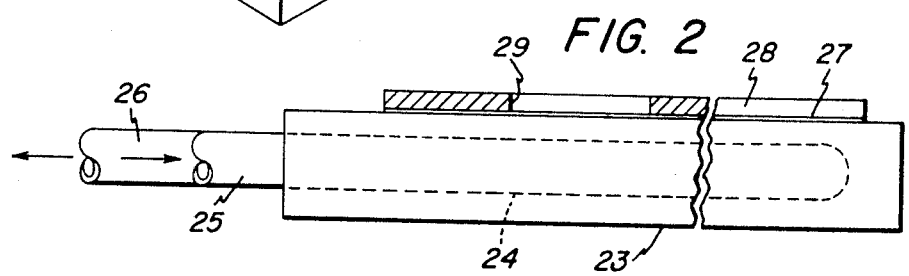
FIG. 2 is an enlarged side elevational view partially in section of a portion of the apparatus shown in FIG. 1.

In FIG. 2 of the drawing, an enlarged side elevation view is shown of support block 23 which was described above in connection with FIG. 1 of the drawing. Block 23 has an U-shaped tube 24 imbedded therein, the two ends 25 and 26 of which circulate a cooling medium to and from block 23, respectively. Electrode 27 and light mask 28 are shown partially in section to disclose more clearly the apparatus. While three slots 29 are described for light mask 28, a single slot or a larger number of slots may be employed.

Figure 3:
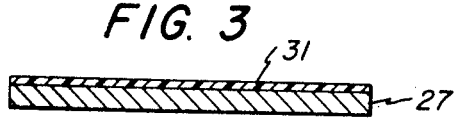
FIG. 3 is a sectional view of an electrode with a dielectric film thereon formed in accordance with our invention.

In FIG. 3 of the drawing, there is shown in section an electrode 27 with a continuous dielectric film adhering firmly to the upper surface. Film 31 is formed on the surface of electrode 27 in the apparatus shown in FIG. 1 of the drawing.

Figure 4:
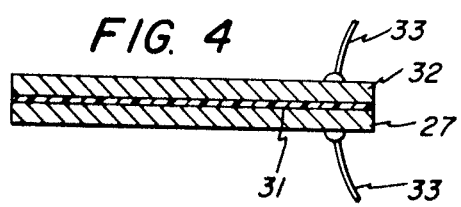
FIG. 4 is a sectional view of an improved capacitor embodying our invention.

In FIG. 4 of the drawing, there is shown in section a capacitor which has a first electrode 27, a continuous dielectric film 31 adhering firmly to its upper surface, a second electrode 32 in contact with dielectric film 31, and an electrical lead 33 connected to each of the electrodes. Film 31 is formed on the upper surface of electrode 27 in the apparatus shown in FIG. 1 of the drawing. Such a capacitor can also be made by employing a composite sheet having a first electrode 27, a dielectric film 31 thereon, and a second electrode 32 in contact with film 31. The composite sheet is cut, subsequently, into a plurality of smaller sheets. Each of the smaller sheets has a pair of leads 33 attached to its electrodes thereby forming a plurality of capacitors.

We have found unexpectedly that a superior capacitor could be formed if one of its pair of electrodes has an adherent, continuous dielectric film on its adjoining surface formed in the manner described above. We have found further that a capacitor could be formed which had a plurality of adjacent electrodes and such a continuous film adhering firmly to the surface of one electrode of each adjacent pair.

We have found also that the above dielectric films could be deposited configurationally, formed a strong, adhesive bond with the electrode surface, were stable at operating temperatures, and exhibited a low dissipation factor, a high capacitance, and a high dielectric breakdown strength.

In an illustrative operation of the apparatus shown in FIG. 1 of the drawing, an electrode 27 was positioned on copper support block 23. A stainless steel light mask 28 with three slots therein was placed on the upper surface of electrode 27. Quartz tube 14 was then attached by its flange 16 to flange 13 of enclosure 12 by means of threaded fastener 17. Vacuum pump 18 was started and pumped down the chamber defined by tube 14, cylinder 15, and enclosure 12 to a pressure of about 1 micron. Valve 20 was then closed. A material selected from the group consisting of ethylene, 2,4-hexadien 1,5-hexadiene methyl methacrylate, hexachlorobutadiene, tetrafluoroethylene, trifluoromonochloroethylene, monofluorotrichloroethylene, hexafluorobutadiene, and acrylonitrile was supplied from the liquid source (not shown) through line 21 in a gaseous state to enclosure 12 whereby it was fed into the interior of quartz tube 14. Each of the above materials is initially retained in its liquid state by maintaining its temperature below room temperature which is accomplished by employing a cooling bath surrounding the liquid materials. The liquid is also maintained at a vapor pressure in the range of 0.1 to 8 millimeters of mercury by the temperature of the cooling bath whereby its introduction from the source to the inlet line is in a gaseous state. Ultraviolet lamp 30, having an effective wave length in the range of 2,000 to 3,500 angstroms, was positioned above quartz tube 14 and spaced approximately two inches from the upper surface of electrode 27.

The monomer was introduced into quartz tube 14 causing a rise in the pressure. A metal hood (not shown) was positioned around apparatus 10 since an ultraviolet light source is used. Lamp 30 is turned on. After a period of time, lamp 30 was shut off, monomer valve 22 was closed, and the system was pumped down to about 1 micron

TABLE I

| Ex. No. | Monomer | Vapor pressure, mm. Hg. | Process time, min. | Average substrate temp., °C | No. electrodes coated | First electrode material | Second electrode material | Dielectric area, cm. | Dielectric constant | Representative capacitance, picofarads | Average film thickness, angstroms | Characteristic capacitance/area, pf./cm.² | Dissipation factor | Breakdown strength, v./cm.×10⁻⁶ |
|---|---|---|---|---|---|---|---|---|---|---|---|---|---|---|
| 1 | C₄Cl₆ | 0.13 | 120 | 102 | 12 | Evaporated aluminum | Evaporated aluminum | 0.25 | 2.9 | 2,580–4,180 | ~1,500 | 13,500 | 0.002–0.007 | 1.0 |
| 2 | C₄Cl₆ | 0.13 | 135 | 102 | 12 | do | do | 0.25 | 2.9 | 3,060–4,000 | ~1,900 | 14,000 | 0.002–0.007 | |
| 3 | C₄Cl₆ | 0.13 | 35 | 102 | 12 | do | do | 0.25 | 2.9 | 6,550–7,500 | ~900 | 28,000 | 0.005–0.007 | |
| 4 | C₄Cl₆ | 0.13 | 285 | 177 | 1 | do | Hg drop | 0.1 | 2.9 | 5,700 | 480 | 57,000 | | 1.1 |
| 5 | C₄Cl₆ | 0.13 | 285 | 177 | 1 | do | do | 0.1 | 2.9 | 5,370 | 508 | 53,700 | | 1.3 |
| 6 | C₄Cl₆ | 0.13 | 285 | 177 | 1 | do | do | 0.1 | 2.9 | 4,240 | 645 | 42,400 | | 1.2 |
| 7 | C₄Cl₆ | 0.13 | 275 | 115 | 1 | do | do | 0.1 | 2.9 | 2,480 | 1,100 | 18,900 | | |
| 8 | C₄Cl₆ | 0.13 | 60 | 115 | 1 | do | do | 0.1 | 2.9 | 1,390 | 1,900 | 13,400 | | |
| 9 | C₄Cl₆ | 0.13 | 30 | 102 | 1 | do | Evaporated aluminum | 0.1 | 2.9 | 1,340 | 2,040 | 24,800 | | 1.2 |
| 10 | C₄Cl₆ | 0.13 | 15 | 115 | 1 | do | do | 13 | 2.9 | 245,000 | 2,180 | 18,850 | 0.004 | 0.2 |
| 11 | C₄Cl₆ | 0.13 | 40 | 102 | 1 | do | do | 13 | 2.9 | 178,000 | 1,650 | 13,700 | 0.004 | 0.2 |
| 12 | Acrylonitrile | 4.0 | 60 | 54 | 12 | do | do | 0.25 | 5.9 | 980–1,660 | 13,000 | 5,300 | | 0.7 |
| 13 | do | 4.0 | 75 | 54 | 12 | do | do | 0.25 | 5.9 | 2,250–2,650 | 9,800 | 9,800 | 0.025–0.09 | 0.3 |
| 14 | do | 4.0 | 65 | 54 | 1 | do | Hg drop | 0.1 | 5.9 | 1,830 | 3,000 | 18,500 | 0.024–0.030 | 0.3 |
| 15 | Methyl methacrylate | 4.0 | 14 | 217 | 1 | do | do | 0.1 | ? | ~11,000 | ~5,000 | ~110,000 | | 0.7 |
| 16 | do | 4.0 | 120 | 217 | 12 | do | do | 0.1 | ? | ~4,490 | 3,250 | 44,800 | | 1.7 |
| 17 | 1,5-hexadiene | 4.0 | 620 | 67 | 1 | do | do | 0.1 | ? | ~5,750 | 610 | 57,500 | | 2.7 |
| 18 | do | 4.0 | 14 | 84 | 1 | do | do | 0.1 | ? | ~2,880 | 475 | 28,900 | | 1.9 |
| 19 | 2,4-hexadiene | 4.0 | 28 | 112 | 1 | do | do | 0.1 | ? | ~5,400 | 945 | ~54,000 | | 0.7 |
| 20 | do | 4.0 | 5 | –2 | 1 | do | do | 0.1 | ? | ~620 | 700 | ~6,200 | | 0.2 |
| 21 | C₂H₄ | 4.0 | 10 | 12 | 6 | Aluminum foil | Evaporated gold | 0.1 | ? | ~15,000 | 6,100 | ~150,000 | | |
| 22 | C₂F₄ | 4.0 | 46 | 12 | 6 | do | do | 0.38 | ? | 9,340 | ~680 | 24,500 | 0.024 | 2.0 |
| 23 | C₂F₄ | 4.0 | 56 | –5 | 6 | Evaporated aluminum | Evaporated aluminum | 0.45 | ? | 30,900 | ~240 | 68,500 | 0.024 | |
| 24 | C₂F₃ | 4.0 | 25 | –5 | 6 | do | do | 0.23 | ? | ~2,790 | 1,480 | 12,100 | 0.039 | |
| 25 | C₂ClF₃ | 3.0 | 45 | 117 | 1 | do | Hg drop | 0.1 | ? | ~250 | ~10,650 | 2,500 | 0.005 | | pressure to remove all by-products. The metal hood was removed and the vacuum was then broken. Tube 14 was cooled to room temperature and disconnected by unthreading fasteners 17 which held its associated flange 16 to flange 13. After tube 14 was removed, metal light mask 28 was removed. Examination of electrode 27 showed that three separate and distinct adherent continuous films 31 had been formed on the upper surface of the electrode.

Such an electrode 27 with its film 31 thereon as described above is shown in FIG. 3 of the drawing.

In FIG. 4 of the drawing, there is shown a capacitor made in accordance with my invention. The capacitor has a first electrode 27, a continuous dielectric film 31 adhering firmly to the upper surface of electrode 27, a second electrode 32 in contact with dielectric film 27, and an electrical lead 33 connected to each electrode. The second electrode 32 is evaporated onto dielectric film 27 from a metal source.

While it is stated above that a first aluminum foil electrode was employed, many other metallic electrodes in various forms and configurations can be employed. For example, one or both of a pair of electrodes can be of the same or of a different metal including, for example, gold, tin, aluminum, copper, and zinc.

Capacitors can also be produced in a similar manner to provide a plurality of adjacent electrodes wherein the above-described dielectric film adheres to the surface of one electrode of each pair of adjacent electrodes in the structure. Furthermore, a capacitor roll is provided in the same manner. Additionally, a plurality of these rolls can be positioned in a container to produce a capacitor structure or can be encapsulated. This latter type of capacitor structure, if electrically conductive, is electrically insulated, for example, by a layer of electrical insulation positioned between the exterior surface of the rolls and the interior surface of the container. Such insulation can be provided by forming additionally the above-described dielectric film on the exterior surface of the second electrode of each capacitor roll.

Examples of capacitors prepared in accordance with my invention are set forth in Table I. In each of these examples, the apparatus of FIG. 1 was employed as described above to provide a first electrode with a continuous, pinhole-free dielectric film adhering firmly to one of its surfaces. The chamber was evacuated initially to a pressure of about one micron in each of the examples. Subsequently, a second electrode was placed in contact with the dielectric film surface and a pair of leads were connected to the respective electrodes.

While other modifications of the invention and variations thereof which may be employed within the scope of the invention have not been described, the invention is intended to include such as amy be embraced in the following claims.

What is claimed is:

1. A product comprising a substrate, a continuous film adhering firmly to at least one surface of said substrate, said film having a thickness of up to 13,000 angstroms and being an ultraviolet surface photopolymerized polymer of gaseous 2,4-hexadiene.

References Cited

UNITED STATES PATENTS 3,271,180  9/1966  White  _____ 117—38

FOREIGN PATENTS 776,326  8/1955  Great Britain _____ 117—93.31

ELLIOT A. GOLDBERG, Primary Examiner

U.S. Cl. X.R.

317—258